April 14, 1936. A. W. CHAPMAN 2,037,366
SLIDABLE SEAT FOR VEHICLES AND THE LIKE
Filed Oct. 17, 1932
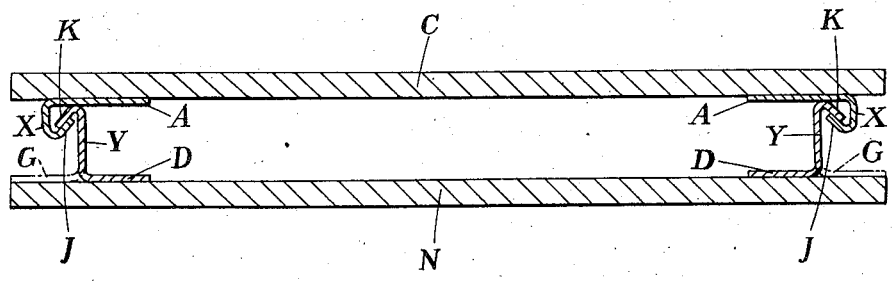
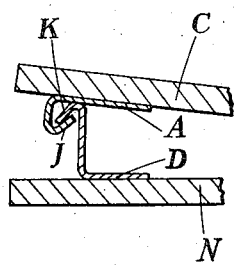 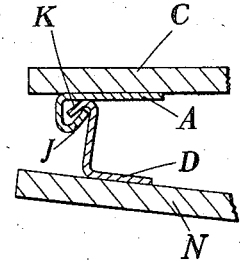
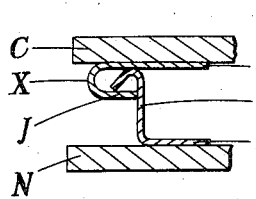 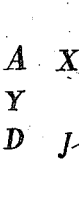 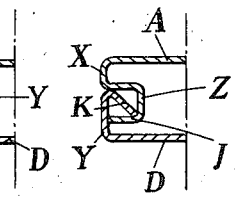 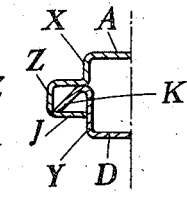
INVENTOR
Arthur William Chapman
BY
Charles H Kesler
ATTORNEY Patented Apr. 14, 1936

2,037,366

UNITED STATES PATENT OFFICE 2,037,366

SLIDABLE SEAT FOR VEHICLES AND THE LIKE

Arthur William Chapman, Putney, London, England

Application October 17, 1932, Serial No. 638,124
In Great Britain October 27, 1931

13 Claims. (Cl. 155—14)

This invention relates to slidable seats for vehicles and the like of the kind comprising a pair of interlocking or interengaging slides, one of the slides being secured upon the floor or other fixture and the other slide secured directly or indirectly to the seat. The proposed slides may have horizontal portions or bases by which they are secured to their respective supports.

The slides comprised in the present invention according to one form are of the type which interengage along one edge or side only, as distinguished from those which have a two-edged engagement, or an engagement involving otherwise more than one line of contact, as for instance, if C slides were used. Means of any convenient kind are provided for locking them against sliding movement when so desired.

According to this form the two interengaging edges or sides of the two slides constituting a sliding pair (viz., of a seat slide and a floor slide) are adapted to slide one upon the other with line contact produced by the convex surface of the bend of the edge of one slide contacting with its complementary slide, and are held against separation in every transverse direction when mounted in working relationship, by reason of their edges being shaped so as to produce an interlocked result, or else so that their interengaged edges merely prevent separation vertically, additional means for resisting lateral separation then being either provided upon one of the slides of the pair, or supplied merely by one pair of slides of hook or J section co-operating with another pair in which the hooks are mutually in the opposite direction.

According to another form the slides are of double engagement type and have convex surfaces formed by the bends of two edges of the pair of slides (either both edges of the one slide or one edge of each slide) making line contact with the other slide of the pair, whereby the weight borne by the slides is transmitted from the seat slide to the floor slide, when one is slid upon the other, through two contact lines, with very little resistance to sliding movement.

The object of the invention is to provide slides of either type mentioned, which when in working position upon the seat and floor are held against transverse separation and at the same time enabled to slide freely upon one another longitudinally with a minimum of resistance to sliding movement and of rattle.

The advantages of the present invention reside in its remarkable efficiency and comparative cheapness, inasmuch as slides embodying the present invention become slides of precision and yet are simple to manufacture and capable of resisting distortion.

Forms of the invention are illustrated by way of example in the accompanying drawing, in which Figure 1 is a cross section of the seat and floor, showing two pairs of interengaging slides;

Figures 2 and 3 are fragmentary views showing slides secured to members which are out of parallel (somewhat exaggerated).

Figures 4, 5, 6 and 7 show other typical forms of the invention.

Referring to Figure 1 of the said drawing, each pair of mutually interengaging slides comprises a flat strip A attachable to the slidable seat C, and having a vertically bent downward portion X terminating in an upwardly inclined edge J, thus presenting an acute angle or hook as seen in section. The complementary floor slide D, attachable to the floor N, is an angle strip having along the top of its wall Y an acute angular downward bend or edge K engaging with the hook member J of the seat slide, and so preventing transverse separation of the slides in any direction when they are in working engagement. The weight of the seat with its load will be supported by the portion A resting upon the top bend (joining Y and K) of the floor slide D, whilst lateral separation will be impossible owing to the edges JK of the respective slides being inclined to the horizontal. The edges of the slides (or one of them) could alternatively be of curved shape in cross section.

The horizontal portions of the respective slides A and D need not lie one vertically above the other, but they can, if convenient, be disposed in opposite directions from one another, by directing the base of the floor slide as shown in dotted lines G. One pair of slides as described (one seat slide and one floor slide) could be used in combination with any other pair of interengaging slides parallel thereto, either of the same sectional form or of any other suitable form.

The slides as now proposed are amenable to slight deviations from parallelism as between the seat and the floor (when viewed transversely), without affecting their sliding efficiency, whereas previously known forms of slides would tend to bind together under such conditions.

Figures 2 and 3 show in an exaggerated manner, deviations from parallelism as between the seat and the floor.

In Figure 2 the seat C is shown dipping towards the centre, and in Figure 3 the seat C is horizontal while the floor N is tilted at an angle.

In the first of these examples, it may be assumed that the seat C is a one-piece seat for two or three persons, and therefore liable to sag in the middle, or the seat base may have warped, whilst in the other example the floor N may be of sheet steel which has become uneven. Binding or jamming of the slides was heretofore preventable by making them a loose or "sloppy" fit, which would cause rattle.

In both of these instances shown in Figs. 2 and 3, however, the seat C remains supported upon the floor slide D and the line contact between the slides is always preserved, as well as their inseparableness.

Their sliding action also remains unimpaired as the slides are held in close sliding contact with each other under all conditions, without introducing any tendency to rattle.

Fig. 4 shows the same form as Fig. 1 but with the hook member J horizontal, and butting against the wall Y to take side play. Fig. 5 differs from Fig. 4 only in the proportion of its parts. Fig. 6 shows a form in which the portion X of the seat slide A is channelled to form a housing Z in which the downwardly bent edge K is accommodated, a similar kind of housing Z being shown in the opposite direction in Fig. 7. In the forms shown in Figs. 4–7, the edge J is horizontal and makes line contact horizontally with the wall Y of the seat slide D, but the edge J may be turned upwards at an angle if preferred.

It is to be understood that the slides may be of box-like section resembling two pairs placed together symmetrically to form a box or enclosure.

Cases sometimes occur where it is necessary to have a very deep section slide, due to the slide having to be attached to the seat at its extremities (with hollow seat construction, for example), and the invention lends itself easily to this requirement, as the seat and floor slides can be made of deep section without increasing the overall height.

Those parts of the surface of the slide which make line contact with the bends of the edges may be horizontal, or curved in any fashion, and they may, if so desired, be provided at the inner surface of the engaging slide, or at the surface of any recess suitably provided in the latter.

Side thrust or racking, which is especially pronounced in a wide one-piece seat for two persons, may also be opposed with line contact, for example, by the edge of one slide at J being bent towards the other slide at Y so as to contact with it.

The relative positions of the seat slides and the floor slides can be interchanged or inverted according to requirements.

I claim:

1. In a slidable seat mechanism, a pair of slide members formed from strips of material and including horizontally extending portions for attachment to the seat and support therefor, one of said members having a portion extending substantially vertically from the horizontal portion thereof and a longitudinal marginal edge portion bent over sharply at an acute angle to said vertically extending portion, and the other of said members having a longitudinal marginal portion bent to form a part extending substantially vertically from the horizontal portion thereof and an angularly related part extending inwardly beyond the free edge of said acutely angled portion and in spaced relation to the horizontal portion to form therebetween a channel open at the inner side thereof, said acutely angled portion being disposed within said channel substantially in contact with the spaced wall portions thereof to prevent play and separation of said members in a vertical direction, and providing between the bend thereof and one of the spaced wall portions of said channel a load sustaining line contact between said members while the same are retained by the other spaced wall portion against relative play.

2. In a slidable seat mechanism, a pair of slide members formed of strips of material and including horizontally extending attaching portions, one of said members having a portion extending substantially vertically from the horizontal portion thereof and a longitudinal marginal portion bent back at an angle to said vertically extending portion to form a relatively sharp bend and a flaring recess therebetween, and the other of said members having a longitudinal margin bent to form a portion extending substantially vertically from the horizontal portion thereof and an angularly related inwardly directed portion in spaced relation to the horizontal portion to form therebetween a recess, said first named angularly related portion being disposed within said last named recess with the bend thereof engaging the contiguous horizontal portion to provide therebetween a load sustaining line contact, and being engaged by said inwardly directed portion to retain the slide members against separation and play in a vertical direction, and said recesses providing clearances for the respective interlocking portions to allow canting of the members without disturbing the play preventing relationship thereof.

3. In a slidable seat mechanism, a pair of slide members formed of strips of material and including horizontally extending portions for attachment to the seat and the support therefor, one of said members having a portion extending substantially vertically from the horizontal portion thereof and a longitudinal marginal portion disposed at an acute angle to the vertically extending portion to form a relatively sharp bend providing between the bend and the horizontal portion of the complementary member a load sustaining line contact, and the complementary member having a longitudinal margin bent to form a portion extending substantially vertically from the horizontal portion thereof and a portion extending from said last named vertically extending portion in angular relation thereto inwardly beyond the edge of said acutely angled part and engaging the same to prevent play and separation of the members in a vertical direction.

4. In a slidable seat mechanism, a pair of slide members having portions for attaching the same to the seat and floor respectively, one of said members including a portion in angular relation to the attaching portion thereof and a longitudinal marginal portion bent back at an acute angle to form a relatively sharp bend, said bend having a load sustaining line contact with the attaching portion of the complementary slide member, and said complementary slide member having an angular longitudinal marginal portion including a part extending into the recess formed by the acutely angled portion and being substantially in contact with said angular portion for obviating vertical and lateral play.

5. In a slidable seat mechanism, a pair of slide members including horizontally extending portions for attaching the slide members to their supports and oppositely extending hook-shaped portions in interlocking relation, one of said hook-shaped portions including a bend having a load sustaining line contact with the horizontal portion of the complementary member, and the interlocking portions being disposed diagonally relative to the horizontally extending portions substantially in engagement with each other for preventing lateral and vertical play.

6. In a slidable seat mechanism, a pair of slide members each including a horizontally extending portion, a substantially vertically extending portion, and a marginal portion bent to form an acute angle with said vertically extending portion and provide a recess therebetween, one of said marginal portions at the bend thereof contacting the horizontally extending portion of the complementary member and providing a load sustaining line contact, and said marginal portions each extending into the recess of the complementary member in interlocking relation and substantially in engagement the one with the other to prevent play in all directions and allow canting of each member relative to the other.

7. In a sliding seat mechanism, a pair of slides, one of said slides having a substantially vertically extending portion and a marginal portion disposed at an acute angle to said vertically extending portion and forming a bearing at the bend thereof the complementary slide member having a horizontally extending portion in engagement with said bend to provide a line contact therewith an angular marginal portion extending from said horizontal portion and including a part extending into the recess formed by said acutely angled portion and substantially in contact therewith to interlock therewith for preventing lateral and vertical play.

8. In a slidable seat mechanism, a pair of slide members including attaching portions, one of said members having a vertically extending body portion terminating in a longitudinal marginal portion bent back at an acute angle to the vertically extending portion to form a relatively sharp bend, the complementary member tangentially engaging said bend to provide a load sustaining line contact and having an angular longitudinal marginal portion including a part extending inwardly beyond the free edge of and in engagement with said acutely angled portion to retain the slides when in working position against separation and play in a vertical direction.

9. A slide mechanism comprising a pair of slide members, one of said members including a body portion and a marginal portion disposed at an acute angle to said body portion and forming a convex bearing at the bend thereof, and the complementary slide member including a bearing portion tangentially engaging said convex bearing to provide a line contact therewith and a marginal portion including angularly related parts forming an acute angle therebetween and receiving therebetween and engaging the angularly disposed marginal portion of the other slide member said marginal portions engaging each other so as to prevent vertical and lateral play.

10. A slide mechanism comprising a pair of slide members, one of said slide members including a transversely extending portion, a portion extending at an angle to said transversely extending portion and a marginal portion disposed at an acute angle to said second named portion to form a convex bearing at the bend thereof, and the complementary slide member including a transversely extending portion tangentially engaging said convex bearing to provide a line contact therewith, a portion extending from said transverse, tangential portion at an angle thereto and a marginal portion extending from said last named portion substantially in parallelism with said transverse, tangential portion to form a space therebetween receiving the marginal portion of the first named slide member, the marginal portion of the complementary slide member engaging the edge of the marginal portion of the first slide member and extending therebeyond into abutting relation with said second named portion thereof to prevent relative movement of the slides.

11. In a slidable seat mechanism, a pair of slide members adapted to be attached to relatively movable parts, one of said members including a horizontally extending portion, a portion extending from the horizontally extending portion in angular relation thereto and a longitudinal marginal portion bent to form an acute angle with said angularly related portion and provide a recess therebetween, the other slide member including a horizontally extending portion contacting with said bend and providing a load sustaining line contact and a longitudinal marginal portion extending from the horizontal portion and including angularly related parts forming a recess therebetween, and said marginal portions each extending into the recess of the complementary member in interlocking relation and substantially in engagement the one with the other to prevent vertical and lateral play and allow canting of each member relative to the other when the members are in adjusted working position.

12. A slide mechanism comprising a pair of slide members having horizontally extending attaching portions, one of said members having a portion extending from the corresponding horizontally extending portion in angular relation thereto and terminating in a longitudinal marginal portion bent back at an acute angle to said angularly related portion to form a relatively sharp bend, and the complementary member having a portion extending from the corresponding horizontally extending portion in angular relation thereto and terminating in a longitudinal marginal channel portion receiving the acutely angled portion of the other slide member, said channel including a part tangentially engaging said bend to provide a load sustaining line contact therewith and an opposing part extending beyond the free edge of and in engagement with said acutely angled portion to retain the slides when in working position against separation and play in a vertical direction.

13. In a sliding seat mechanism, coacting slide members arranged in pairs and attached to the seat and the support therefor respectively, one of the slide members of each pair having a substantially vertically extending body portion terminating in a marginal portion bent back at an acute angle to the body portion to form a relatively sharp bend, the complementary slide member of each pair having a horizontally extending portion tangentially engaging said bend to provide a load sustaining line contact and an angular marginal portion including a part extending inwardly beyond the free edge of and in engagement with said acutely angular portion to prevent vertical play, the slide members of each pair also engaging each other in a lateral direction, and said pairs of slide members cooperating to prevent lateral play.

ARTHUR WILLIAM CHAPMAN.